May 3, 1927.

W. L. WIKE 1,627,422

ROTARY RAKE

Filed April 13 1925

WITNESSES
C. L. McDonald
E. N. Lovewell

INVENTOR
William L. Wike
BY
E. G. Siggers
ATTORNEY

May 3, 1927. 1,627,422
W. L. WIKE
ROTARY RAKE
Filed April 13, 1925 2 Sheets-Sheet 2
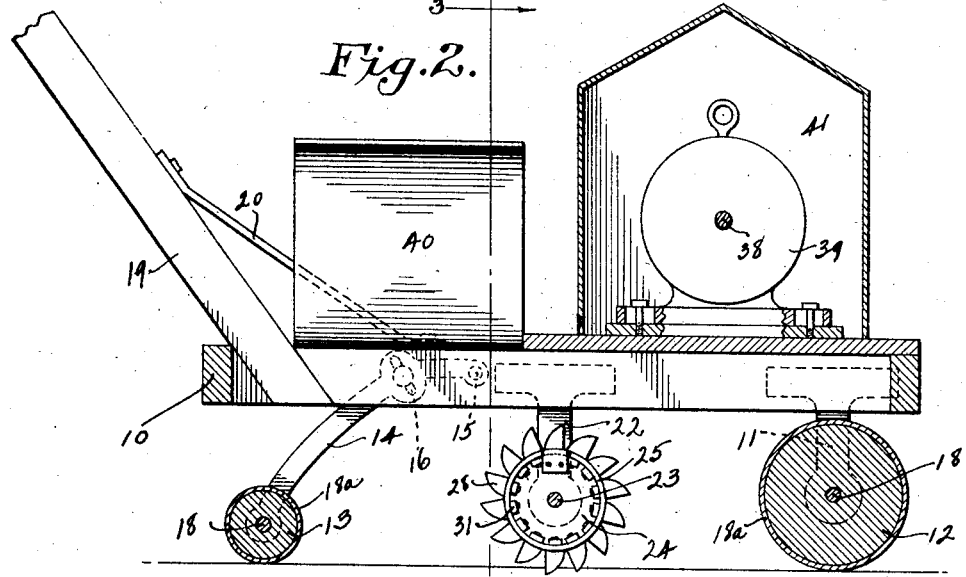
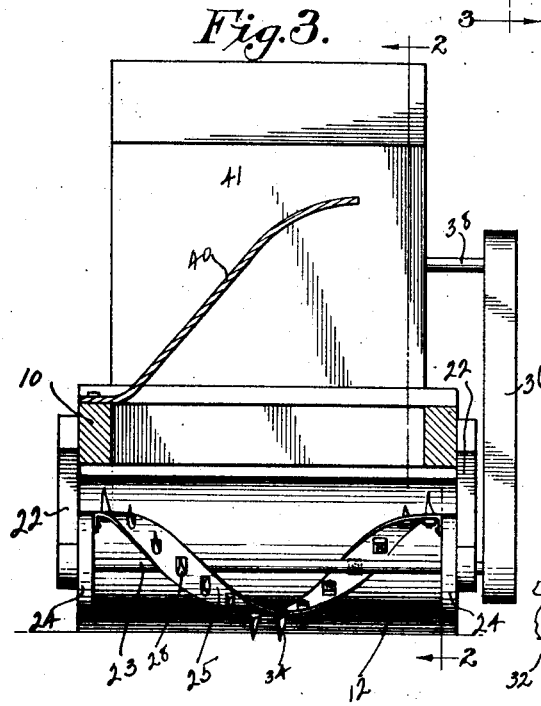
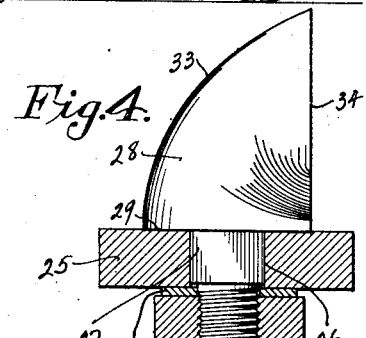
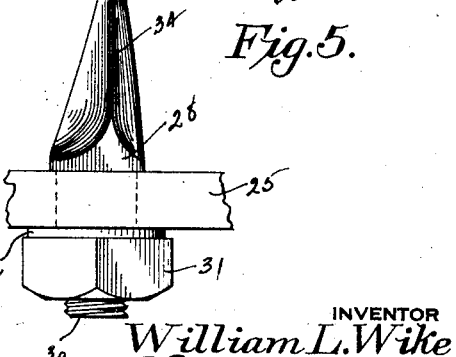
WITNESSES
C. L. McDonald
E. N. Lovewell
INVENTOR
William L. Wike
BY
ATTORNEY Patented May 3, 1927.

1,627,422

UNITED STATES PATENT OFFICE.

WILLIAM LINCOLN WIKE, OF RIVERSIDE, CALIFORNIA, ASSIGNOR OF FIFTY-ONE PER CENT TO HERBERT RICHMOND, OF RIVERSIDE, CALIFORNIA.

ROTARY RAKE.

Application filed April 13, 1925. Serial No. 22,835.

This invention relates to a rotary rake adapted for use on lawns, especially for eradicating Bermuda grass and similar pests.

The general object of my invention is to provide a device, preferably power driven, which, when moved longitudinally and transversely over the lawn, will tear out practically all of the Bermuda grass runners, cut them into short lengths, and leave them on top of the lawn where they may be easily collected and burned, or otherwise disposed of.

One embodiment of my invention is shown in the accompanying drawings, in which—

Figure 2 is a vertical longitudinal section taken substantially on the line 2—2 of Figure 3.

Figure 3 is a transverse section taken on the line 3—3 of Figure 2.

Figure 4 is a detail view of one of the raking and cutting teeth, illustrating also the manner of mounting the same.

Figure 5 is a detail view taken at right angles to Figure 4.

Figure 1:
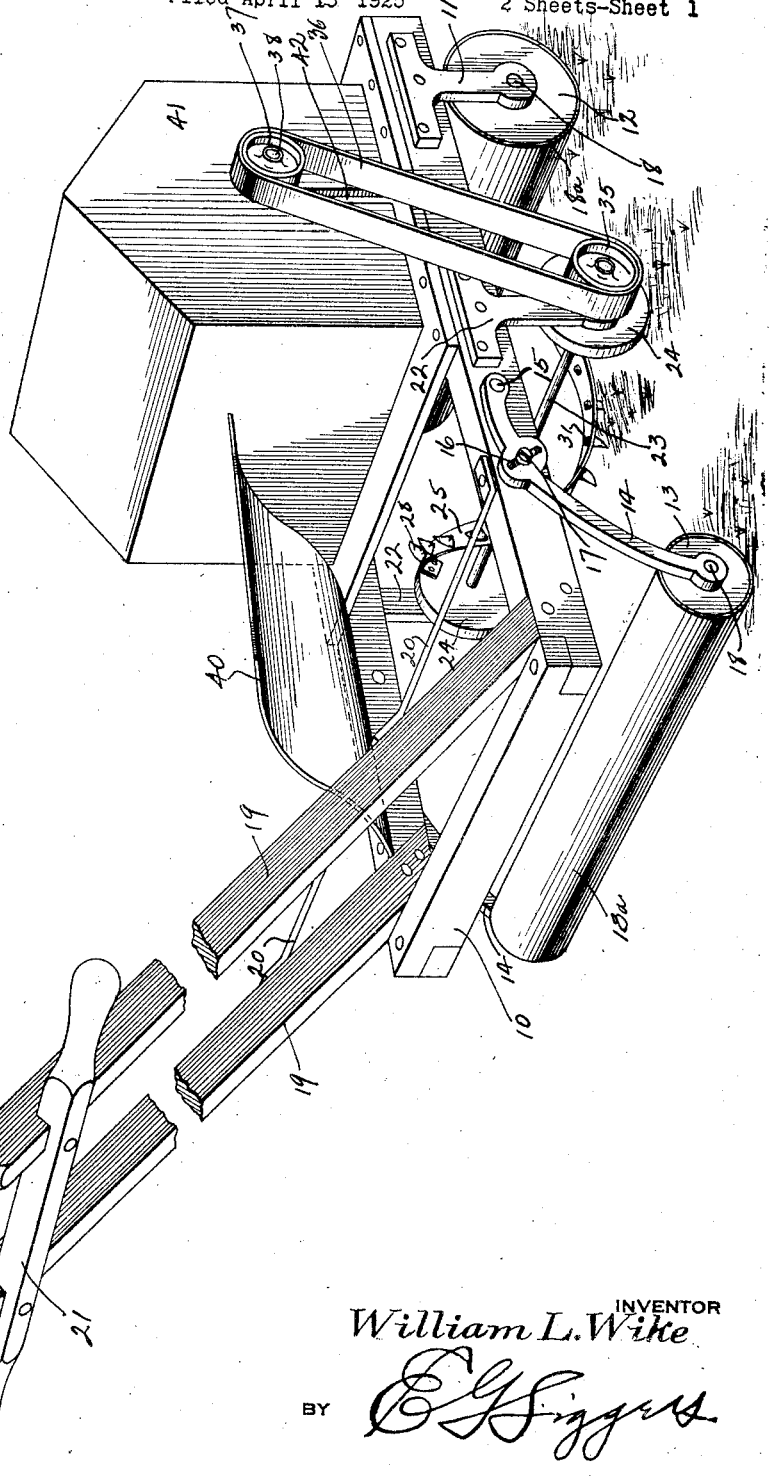
Figure 1 is a perspective view thereof.

Referring in detail to the drawings, the invention comprises a main frame 10, having depending brackets 11 secured to its forward end, and supported by a ground roller 12. At the rear end, a second roller 13 is mounted in arms 14, which are pivotally connected, as at 15, to the frame 10, and are each provided, intermediate their ends, with a transversely disposed slot 16 which receives a screw or other fastening device 17, by means of which the elevation of the rear end of the frame 10 may be adjusted. Each of the rollers 12 and 13 may conveniently be made of wood with a central shaft 18, and is preferably covered with sheet metal, as indicated at 18ª, to prevent mud or wet grass from sticking to the roller.

In the form shown in the drawings, the machine is adapted to be manually propelled over the surface of the ground, and for this purpose upwardly and rearwardly extending rails 19 are secured to the rear end of the frame, and provided with suitable braces 20, and are connected at their upper ends by a handle 21.

Secured to the sides of the frame 10 between the front and rear rollers are depending arms 22, in which a transverse shaft 23 is journaled. Disks 24 are secured to the shaft 23 near the ends thereof, and secured to these disks is a flat, spiral strip 25, which is provided with a series of equally spaced polygonal holes 26 adapted to receive the shanks 27 of the raking and cutting teeth 28. Each of these teeth 28 is formed with a shoulder 29 adapted to bear against the outer face of the strip 25, and the end portion of the shank 27 is threaded, as at 30, to receive a nut 31, underneath which may be placed a washer 32. The rear face of the tooth 28 is curved, as shown at 33, and its front side is in the shape of a sharpened blade 34, which has a lateral trend so that as the shaft 23 rotates rapidly the material torn up by the teeth will be thrown therefrom laterally of the machine.

The shaft 23 is provided at one end with a driving pulley 35, which is connected by a belt 36 to a pulley 37 secured to the main shaft 38 of a motor 39 mounted on the frame 10. Any type of motor may be used; that shown in the drawings being an electric motor, which may be connected by wires to the house current.

A deflector plate 40 is secured to the frame 10 and extends over the revolving teeth 28, so that as the detached material is thrown upwardly and laterally against the deflector, the latter will aid in casting the same toward the side of the machine. The motor 39 is preferably protected by a housing 41, which rests on the frame 10, and has a slot 42 to receive the motor shaft 38.

In the operation of the machine, the teeth 28 are rapidly revolved with the shaft 23, and are so disposed that in the lower part of their orbit they penetrate the ground to a depth of one-half to one inch. By adjusting the roller 13, the rear end of the frame may be raised or lowered, thereby varying the depth to which the teeth penetrate the ground, the correct depth depending somewhat upon the character of the soil. A machine which is large enough for use in cutting lawns may be easily propelled manually. The teeth are revolved quite rapidly, and their engagement with the ground will assist in moving the machine forwardly. The teeth as they penetrate the ground will tear out the Bermuda grass runners, and cut the same into comparatively short lengths, and the rapid revolution of the teeth will cause the fragments of grass to be cast off by centrifugal force, the lateral trend of the blades 34 and the laterally inclined deflector plate 40 cooperating to cast them to one side of the machine. Usually, it will be necessary to run the machine over each part of the lawn in two directions in order to completely eradicate the runners. The latter may subsequently be raked up by a light hand rake. It will usually be convenient for one man to operate the machine, while another man rakes up and wheels away the trash. The passage of the machine over the lawn does not materially injure the blue grass and clover, and the cuts or scars left in the ground are just enough so that fertilizer or grass seed may be sown, and will not be washed off when the lawn is watered. If the surface of the lawn is a little uneven, the teeth, when passing over the high places, will penetrate deeper into the ground, and will have a tendency to level it. The teeth are easily attached to the spiral strip 25 or removed therefrom, and it is consequently very easy to replace them when they become worn or broken.

While I have shown and described in considerable detail one specific embodiment of the invention, it is obvious that various modifications may be made in the size and shape and relative arrangement of the various elements thereof without departing from the salient features of the invention, and it is, therefore, my desire to include all such modifications within the scope of the appended claims.

What is claimed is:

1. In a lawn rake, the combination of a frame mounted so as to be propelled over the ground, a transverse shaft rotatably mounted in the frame, means for driving said shaft, a series of radially projecting teeth supported by said shaft and adapted to penetrate the ground in the lower part of their orbit, the front portion of each tooth being in the form of a sharpened blade with a lateral trend, and a deflector secured to the frame and cooperating with the teeth to cast the detached material toward one side.

2. In a lawn rake, the combination of a frame mounted so as to be propelled over the ground, a transverse shaft rotatably mounted in the frame, means for driving said shaft, a series of radially projecting teeth supported by said shaft and adapted to penetrate the ground in the lower part of their orbit, and a deflector plate mounted in the lower part of the frame and overhanging the teeth, said deflector plate having an inclination laterally of the frame, so as to deflect toward one side the material thrown upward from the teeth.

In testimony, that I claim the foregoing as my own, I have hereto affixed my signature.

WILLIAM LINCOLN WIKE.